United States Patent [19]
Freitag et al.

[11] Patent Number: 5,403,100
[45] Date of Patent: Apr. 4, 1995

[54] BALL RACE SLEW BEARING

[75] Inventors: Helmut Freitag, Krefeld; Bernd Meyenburg, Dusseldorf, both of Germany

[73] Assignee: Krupp Fordertechnik GmbH, Duisburg, Germany

[21] Appl. No.: 98,393

[22] PCT Filed: Nov. 27, 1992

[86] PCT No.: PCT/EP92/02735
§ 371 Date: Sep. 10, 1993
§ 102(e) Date: Sep. 10, 1993

[87] PCT Pub. No.: WO93/12352
PCT Pub. Date: Jun. 24, 1993

[30] Foreign Application Priority Data

Dec. 18, 1991 [DE] Germany .................. 41 41 759.3

[51] Int. Cl.$^6$ .............................................. F16C 33/76
[52] U.S. Cl. ...................... 384/477; 384/499; 384/513
[58] Field of Search ............... 384/477, 499, 506, 513, 384/514, 515

[56] References Cited
U.S. PATENT DOCUMENTS 4,671,682 6/1987 Yoshihara ..................... 384/484

FOREIGN PATENT DOCUMENTS 338589 6/1921 Germany .
2434376 6/1975 Germany .

Primary Examiner—Lenard A. Footland
Attorney, Agent, or Firm—Herbert Dubno

[57] ABSTRACT

Ball race slewing gear, for example, for open-cast mining equipment, are oil-lubricated ball race lower parts made up of segments and receiving the supporting balls supporting the superstructure, which can be rotated in relation to the lower frame. To improve the sealing of the segments (1) against oil leaking out of the separating lines and to make it superfluous to disassemble the ball race slewing gear for each renewal of the seal, the end faces of the segments (1) are formed with recesses (2) which enclose the ball race (3) in U-shape and whose arms (5) are open in the direction of the inside and outside of the ball race lower part and which receive strand-shaped rubber or plastics sealing sections (6). The sealing sections (6) have segment side sealing lips (9) and a continuous cavity (10) and are each disposed completely in one of the two abutting segments. The sealing ring enclosing the ball race lower part and the internal oil collecting ring are interrupted in the zone of the separating lines and closed by readily removable extension members (7, 8). A leakage monitoring device is connected outside the sealing sections (6) in the zone of the transition between the web (4) and arms (5) of the recess (2).

8 Claims, 2 Drawing Sheets

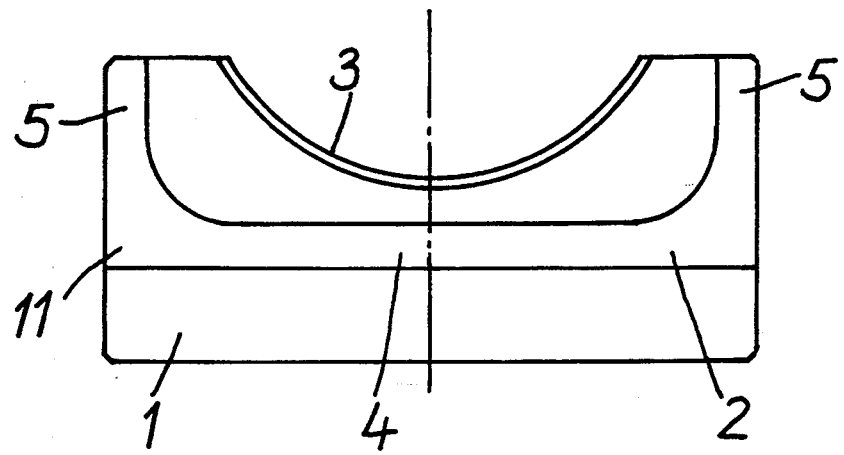
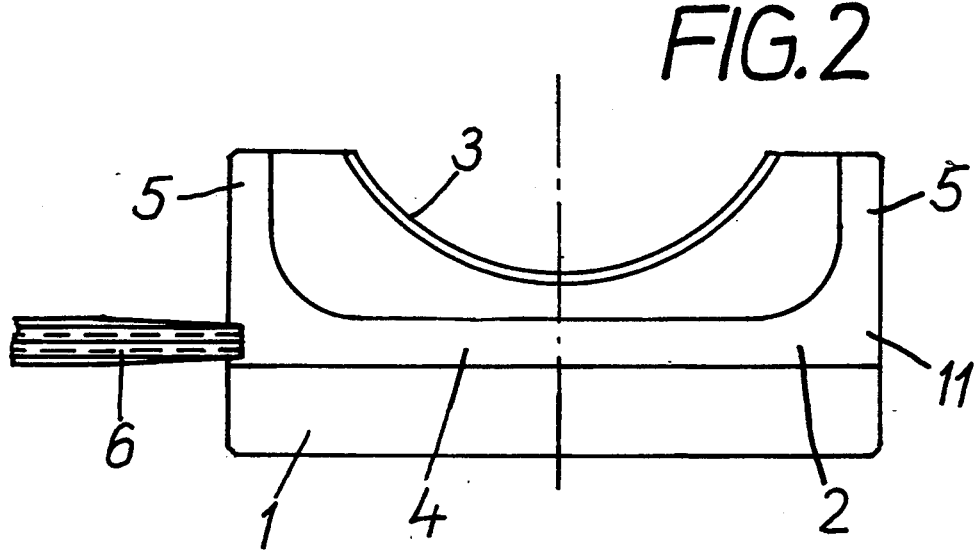
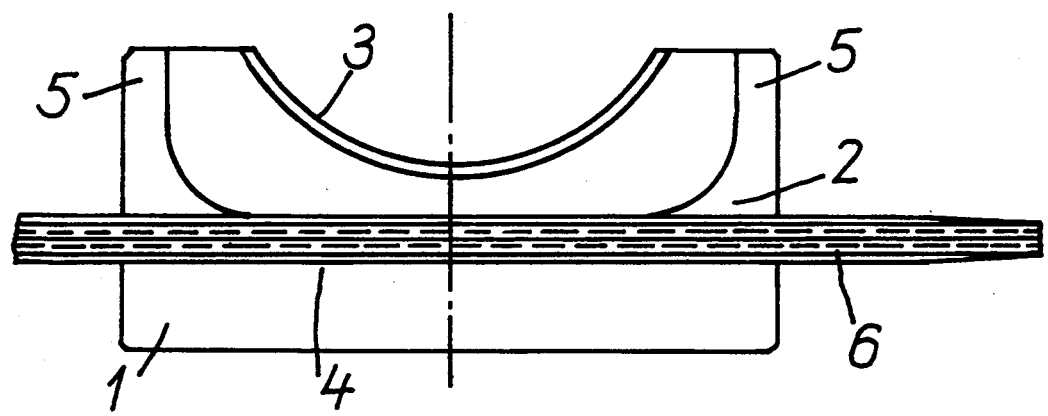

BALL RACE SLEW BEARING

CROSS REFERENCE TO RELATED APPLICATION

This application is a national phase of PCT/EP 92/02735 filed 27 Nov. 1992 and based, in turn, upon German national application P41 41 759.3 filed 18 Dec. 1991.

The present invention relates to a ball race for a slew bearing, having: an annular lower ball race part made up of a number of segments; a sealing ring externally enclosing said lower part and an oil collecting ring enclosed thereby; and a seal between the segments of the ball race lower part.

BACKGROUND OF THE INVENTION

Slew bearings are used, for example in open-pit mining equipment to enable the superstructure of such equipment to rotate in relation to the lower frame; they are constructed with a diameter up to several meters. The circular ball race in which the supporting balls run between the upper and lower parts of the ball race —i.e., between the superstructure and the lower frame—, has an oil lubrication system. Merely for economic considerations, oil losses must be kept as low as possible. Environmental protection also demands a construction which is substantially free from oil losses. In the prior art ball race slewing gear permanently plastic mastic or two-component silicone rubber is introduced into grooves of round cross-section in the separating lines between the segments in order to seal the ball race, which is usually made up of four to six, but also even up to twelve segments. Even with a construction which is at first (upon initial construction) satisfactory with respect to sealing tightness, due to unavoidable slight movements of the segments in relation to one another at the separating lines, sealing-tightness is reduced, so that as operations continue, leakage take place. No improvement, such as permanent sealing, results even by application of hand-cut rubber sections. Environmental protection requirements demand the detection of any leakages which may occur and their elimination. This can make considerable expense, since the superstructure must be lifted off the lower frame and the ball race parts dismantled and reassembled. Since as a rule the ball race lower part has an external sealing ring and an internal oil collecting ring, or vice-versa, these members must also be dismounted before the segments are separated from one another, for the introduction of a fresh seal.

OBJECT OF THE INVENTION

It is an object of the invention at one and the same time to provide a more reliable seal and to substantially reduce the aforementioned expense.

SUMMARY OF THE INVENTION

Accordingly, in a ball race for a body slew bearing of the kind specified, at the separating lines of annular body receiving the ball race, the segments have recesses having a plan vertical base surface and which extend at a distance from the ball race in a U-shape. The recesses have vertical arms which are open in the direction of the inside and outside of the ball race lower part and into which strand-shaped rubber or plastic sealing sections are drawn. As a result, the seal can be replaced without lifting the superstructure. All that is required is to remove the sealing ring and the oil collecting ring, which are usually made up of a number of parts, since then the outside of each recess and the inner side of the recess are exposed over the full heights of their arms. The ends of the sealing section can be folded downwards and the sealing section can be drawn out and a fresh sealing section inserted. This reduces the cost of repair to a small fraction of its previous amount. Conveniently the width of the horizontal portion of the groove and recess the width of the arms of the recesses, and the width of the seal are the same, so that the sealing sections can have a uniform cross-section over their whole length. It is also advantageous that the sealing sections should have a square cross-section.

Also advantageously on the two sides facing the segments of the annular body to be sealed against one another the sealing sections have preferably three sealing lips. The seal can also have a continuous, preferably circular cavity. The resulting seal has been found to have maximum effectiveness even if the segments make fairly large movements. The seal can, moreover be readily drawn in and out. In any case, even if, for example, a separation between the segments increases, the sealing sections can be constructed with a sectional shape adapted to any changes which may have taken place.

As regards the position of the seal at the particular separating line, a construction can be used in which either one half of the recess of each separating line is disposed in each end face of the two particular segments of the ball race lower part, or the recess of each separating line is disposed completely in one of the two end faces of the two particular segments of the ball race lower part. One construction has the advantage that the two sides of the separating line are symmetrical, while the other construction has the advantage of reduced groove machining costs.

According to another feature of the invention, the sealing ring and the oil collecting ring are interrupted in the zone of the separating lines at least to the width of the sealing sections. The gaps are closed by extension members. As a result, for the renewal of the seal the whole sealing ring or oil collecting ring need not be removed, but all that is needed is to take off the extension members, which are replaced when the seal has been renewed. Moreover, the extension members can be handled by one person and therefore without particular difficulty.

Particularly advantageously, leakage monitoring is made possible by the feature that a leakage monitoring device is connected outside the sealing section to the recesses in the zone of the transition between the web and the arms. The space for the connection is available in any case and can be used for immediate response or less sensitive leakage detection and is moreover readily accessible without the dismantling of the seal, so that an inspection can also be carried out for checking purposes. The sealing must be removed only when it has actually become damaged.

BRIEF DESCRIPTION OF THE DRAWING

The above and other objects, features, and advantages will become more readily apparent from the following description, reference being made to the accompanying drawing in which:

FIG. 1 is a section through a segment of a ball race lower part taken along line 1—1 of FIG. 5;

FIG. 2 is the same view showing a seal about to be inserted, the seal being shown in a side view;

FIG. 3 is the same view with a sealing section drawn in;

Figure 4:
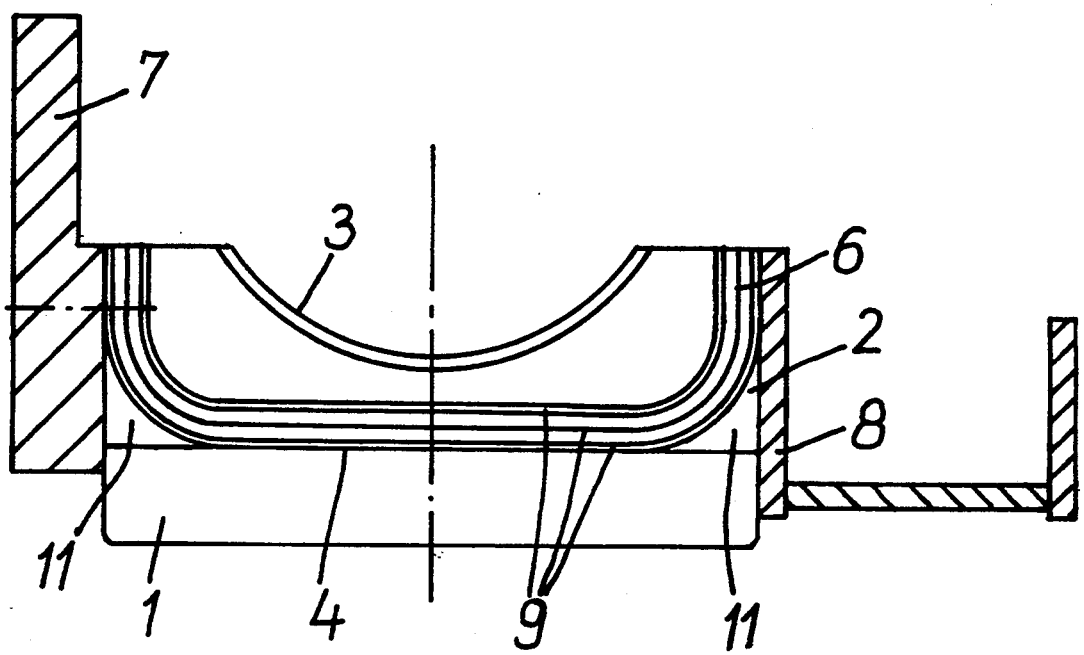
FIG. 4 is the same view, with the sealing section completely introduced and the sealing ring and oil collecting ring attached.
Figure 5:
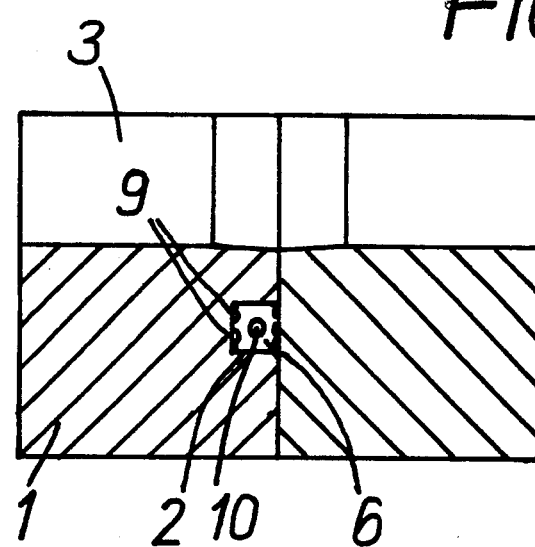
FIG. 5 is a section along line V—V of FIGS. 1-4 with a sealing section introduced on one side.

A ball race body of a slew bearing of an open-pit mining apparatus, having the slew bearing between the superstructure and lower frame and having supporting balls 20 supporting the superstructure, is made up of segments 1 adjoining at separating joints 21. The end face of at least one segment —i.e., the surface forming the separating joint between the segments, is formed with a recess 2 having a plane vertical base surface 22 bracketing a ball race 3 in U-shape. The horizontal section or web 4 and the vertical arms 5 of the recess 2 are of identical width, so that they can receive a continuous strand-shaped sealing section 6. The arms 5 are open in the outward direction ( to the left and right in FIG. 1), so that the sealing sections 6 are readily accessible. During operation the openings are closed solely by extension members 7$^1$ and 8$^1$, which fill corresponding gaps in a sealing ring 7 which in the embodiment illustrated encloses the ball race lower part on the outside and in an oil collecting ring 8 enclosed by said lower part on the inside FIG. 4. The sealing sections 6 are of substantially square cross-section and are inserted into a separating line on one side (FIG. 5) and have three sealing lips 9 on the two segment-side surfaces and a continuous circular cavity 10. A leakage monitoring device 23 to check the sealing effect of the sealing sections 6 is connected in the zone 11 of transition between the web 4 and arms 5 of the recess 2.

We claim:

1. A ball race assembly for a slew bearing which comprises:
    a horizontal annular body formed with a lower ball race and composed of a plurality of segments adjoining at respective vertical junction planes whereby each pair of adjoining segments has end faces juxtaposed at a respective one of said planes;
    means forming an oil-collecting ring attached to said body and inwardly thereof;
    means forming a sealing ring extending around an outer side of said body and attached thereto; and
    respective sealing means at each of said junction planes sealing between segments of said body, each of said sealing means including:
    a U-shaped recess formed in at least one of the end faces of a respective segment at the respective junction plane and open toward the end face of another of said segments at each junction plane, said U-shaped recess having a horizontal web section spaced below said bearing race and a pair of vertical arm sections spaced from and bracketing said bearing race between them, said arm sections being open respectively inwardly and outwardly at inner and outer sides of said body respectively, said recess having a planar vertical base surface, and
    a sealing strand of rubber or plastic received in said recess and abutting said base surface, said sealing strand being bent to lie in said arm sections and extending continuously through said recess.

2. The assembly defined in claim 1 wherein said web section and said arm sections are of equal width corresponding to a width of said strand.

3. The assembly defined in claim 2 wherein said sealing strand is of square cross section.

4. The assembly defined in claim 1 wherein said strand has sides abutting said segments each formed with three lips, said strand having a central continuous circular cavity.

5. The assembly defined in claim 1 wherein said recess is provided in only one of the segments at each junction plane and the respective strand abuts a planar face of the other segment at each junction plane.

6. The assembly defined in claim 1 wherein each of the segments at each junction plane is formed with a respective recess, each strand being housed in juxtaposed recesses of both segments at a respective junction plane.

7. The assembly defined in claim 1 wherein said sealing ring and said oil-collecting ring are interrupted at each of said junction planes to form respective gaps closed by respective extension members.

8. The assembly defined in claim 1, further comprising a leakage monitoring device in a zone of transition of said recess between the respective web sections and one of said arm sections.

* * * * *